Jan. 3, 1928.

F. F. BRADSHAW 1,654,957

APPARATUS FOR LOADING AND UNLOADING AEROPLANES WHILE IN FLIGHT

Filed July 10, 1925    6 Sheets-Sheet 1

Inventor
Frank F. Bradshaw
By Paul B. Eaton
Attorney

Jan. 3, 1928. 1,654,957
F. F. BRADSHAW
APPARATUS FOR LOADING AND UNLOADING AEROPLANES WHILE IN FLIGHT
Filed July 10, 1925 6 Sheets-Sheet 2

Inventor
Frank F. Bradshaw
By Paul B. Eaton
Attorney

Jan. 3, 1928. 1,654,957
F. F. BRADSHAW
APPARATUS FOR LOADING AND UNLOADING AEROPLANES WHILE IN FLIGHT
Filed July 10, 1925 6 Sheets-Sheet 3
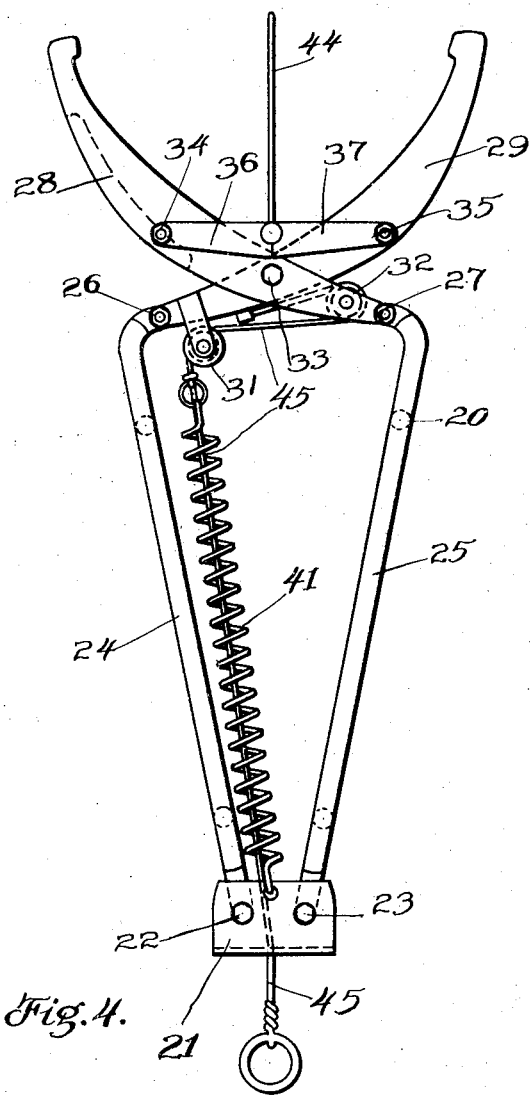
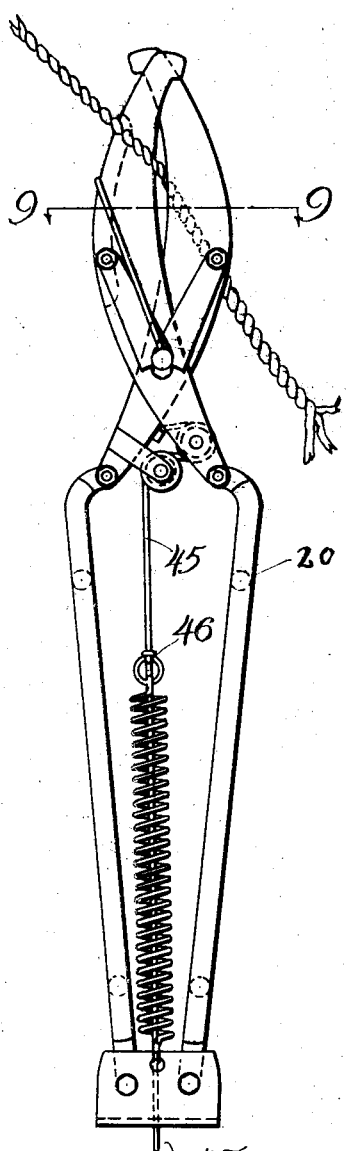
Inventor
Frank F. Bradshaw
By
Attorney Jan. 3, 1928. 1,654,957
F. F. BRADSHAW
APPARATUS FOR LOADING AND UNLOADING AEROPLANES WHILE IN FLIGHT
Filed July 10, 1925 6 Sheets-Sheet 4
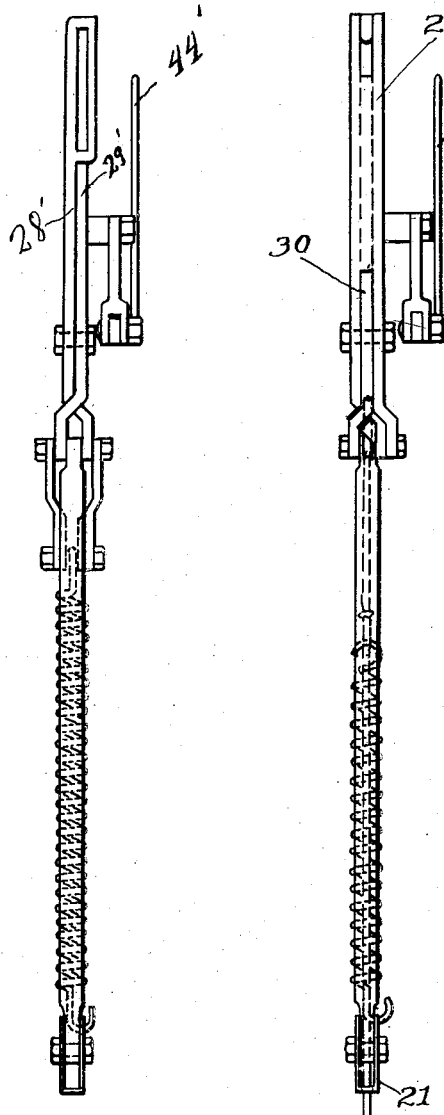
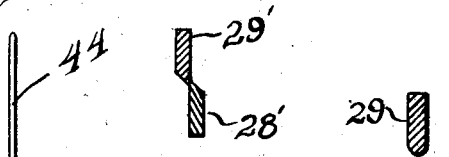
Fig. 8. 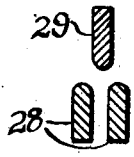 Fig. 9.
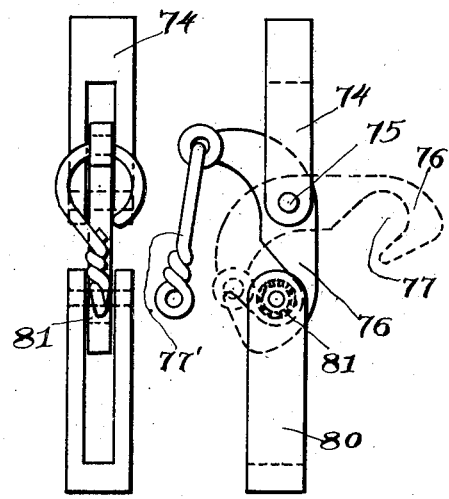
Fig. 11. Fig. 10
Fig. 6. Fig. 7.
Inventor
Frank F. Bradshaw
By Paul B Eaton
Attorney Jan. 3, 1928.   1,654,957
F. F. BRADSHAW
APPARATUS FOR LOADING AND UNLOADING AEROPLANES WHILE IN FLIGHT
Filed July 10, 1925    6 Sheets-Sheet 5

Inventor
Frank F. Bradshaw
By Paul F. Eaton
Attorney

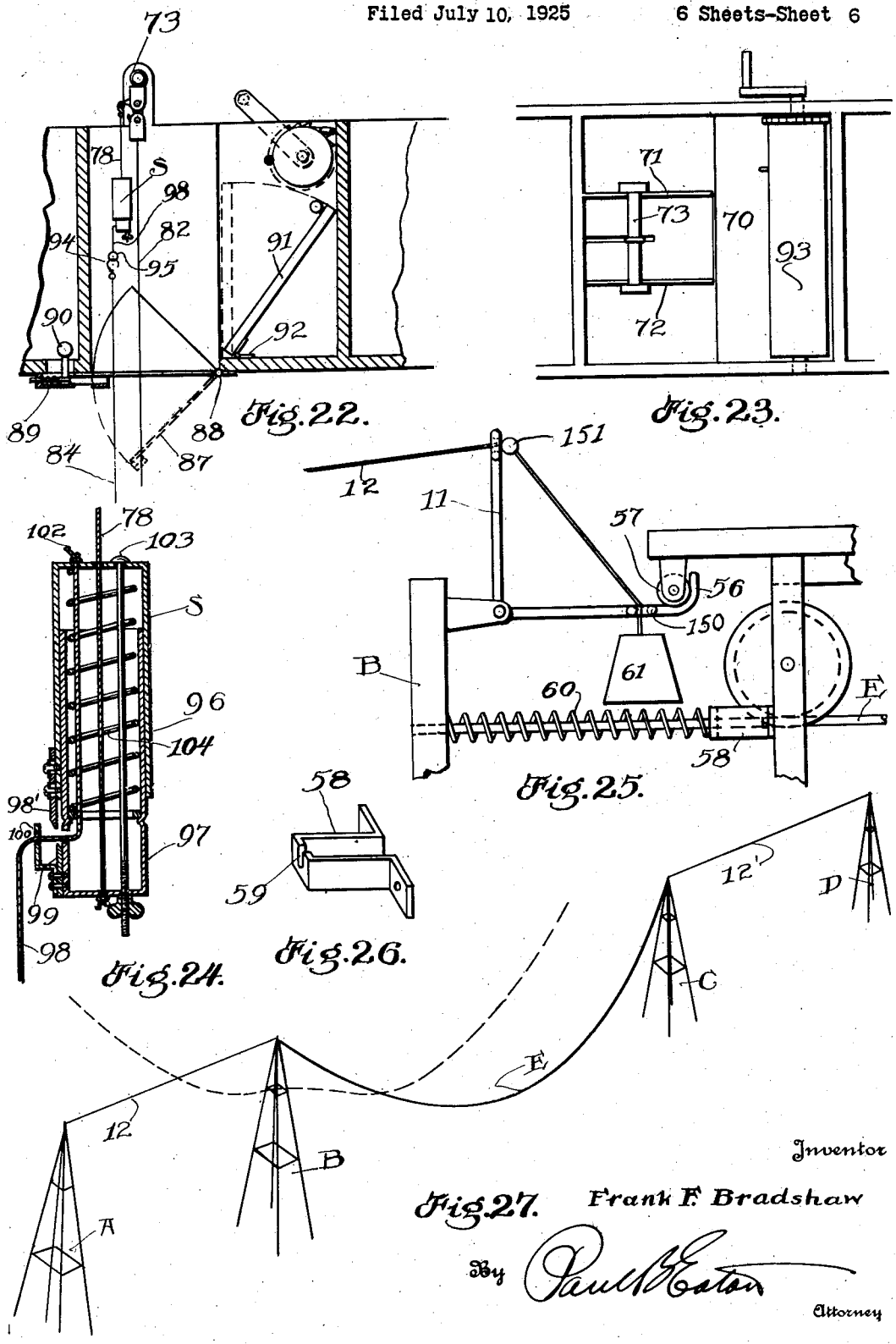

Patented Jan. 3, 1928.

1,654,957

UNITED STATES PATENT OFFICE.

FRANK F. BRADSHAW, OF OXFORD, NORTH CAROLINA.

APPARATUS FOR LOADING AND UNLOADING AEROPLANES WHILE IN FLIGHT.

Application filed July 10, 1925. Serial No. 42,764.

My invention relates to means for unloading articles such as bags of mail from a flying machine while in flight, and also loading articles onto the flying machine while in flight, some of the objects of invention being: To provide means for suspending articles to be picked up by the flying machine on a platform on a cable stretched between two towers; to provide means on the platform to grasp and hold a trailing cable suspended from the flying machine, and at the same time to cut the trailing cable at a point below the point grasped; to provide a platform mounted for travel on a cable and capable of holding an article ready to be picked up by a flying machine; to provide means whereby the platform will travel on a cable; to provide means on the tower, which when released, will impart an initial movement to the platform and cause it to move along the cable suspended between two towers; to provide means in the flying machine for dropping articles from the flying machine; to provide means for picking up articles by the flying machine at the same time that the article or articles are dropped; to provide means for automatically severing the trailing cable if it should become entangled permanently with any object outside the flying machine; to provide means within the flying machine for carrying a plurality of articles associated with means for dropping these articles from the flying machine, and for picking up other articles from a traveling platform located on a cable.

In order that the invention may be thoroly understood it might here be stated that the purpose is to have a flying machine, preferably an aeroplane, equipped with special means for holding an article, preferably a bag of mail, in readiness to be dropped as the plane approaches the towers and at the same time there will be cooperating means located in the hold or cock-pit of the aeroplane for automatically releasing the bag of mail as the aeroplane passes over the towers. Coupled with the above described means there will be other means for picking up a bag of mail deposited on the top of the carriage suspended on the cable between the two towers.

On the carriage will be means for grasping a rope or cable trailing from the aeroplane, and to these grasping means will be secured another bag of mail which will be picked up by the aeroplane and carried away. At the same time that the trailing rope or cable is grasped by the grasping means on the platform there will be other means located on the platform for cutting the rope or cable in twain, and allowing the weight suspended at the lower end of the rope or cable to drop to the ground. Broadly this is what is to be accomplished, and a detailed description of each of the means necessary to accomplish this result will be given.

Having thus stated some of the objects of my invention, other objects will appear as the description proceeds, a brief description of the different figures in the drawings will now be given, in which Figure 1 is a perspective view taken from above the tower but below the flying machine, the flying machine shown as travelling to the right, but diagonally away from the observer, with the trailing cable between the observer and the carriage cable;

Figure 4 is a plan view of the means for gripping the trailing cable; showing said means in open position;

Figure 5 is a plan view of the gripping means in closed position;

Figure 6 is a side view of the shears; as shown in Figure 3;

Figure 7 is a side view of Figure 5;

Figure 8 is a cross-sectional view along the line 8—8 in Figure 3, showing the blades of the shears in closed position;

Figure 9 is a cross-sectional view along the line 9—9 in Figure 5, showing the gripping means approaching closed position;

Figure 10 is a view of the means for dropping an article from the flying machine;

Figure 11 is a rear elevation of Figure 10;

Figure 22 is a side elevation in section of the cock-pit of a flying machine showing means for dropping articles and also means for picking up articles;

Figure 23 is a plan view of the cock-pit;

Figure 24 is a sectional view of safety cord releasing means;

Figure 25 shows means for releasing the carriage together with means for imparting movement to the carriage;

Figure 26 is a perspective view of the carriage release spring bumper;

Figure 27 is a perspective view of the location of the towers, cable, and cords employed in the operation of my invention;

Figure 1:
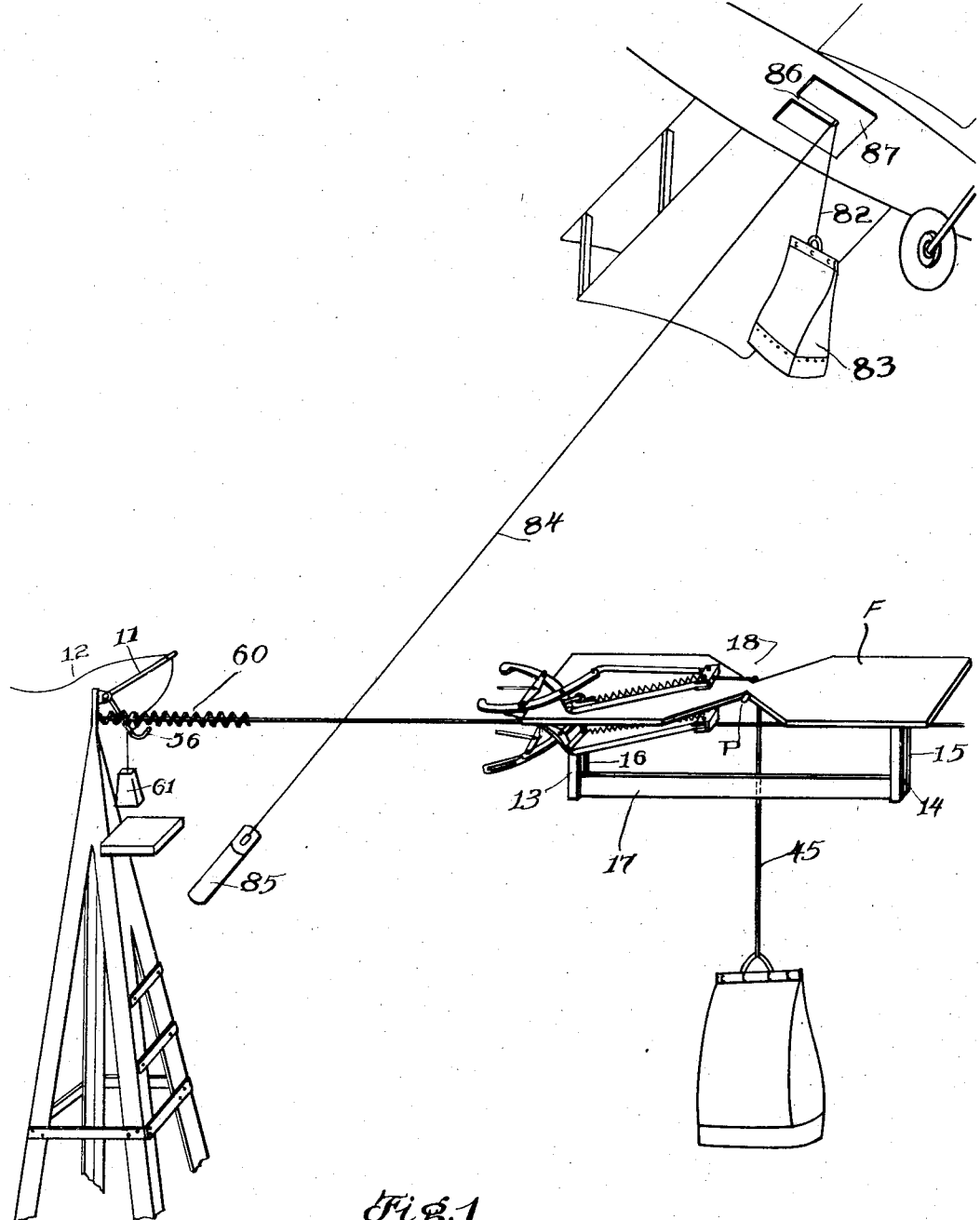
Figures 2, 3:
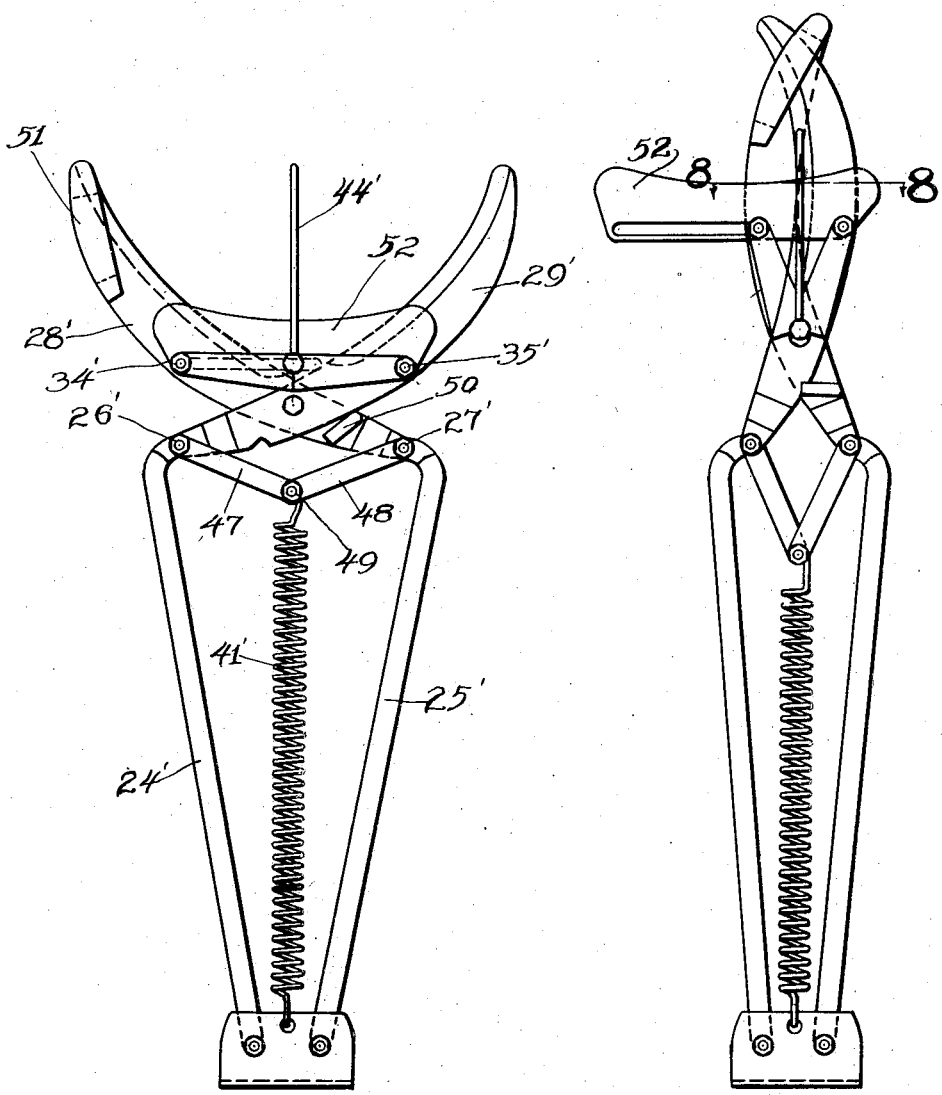
Figure 2 is a plan view of the shears in open position.
Figure 3 is a plan view showing the shears in closed position.

Having thus briefly described the different figures in the drawings, a detailed description of the drawings will now be given in which corresponding reference characters indicate corresponding parts thruout the drawings, in which the letters A, B, C, and D indicate four towers built in approximately a straight line. These towers may be of any desired height, but for purposes of illustration we will presume in the present instance that they are sixty feet high, and that the towers B and C are one thousand feet apart, while the towers A and D are located approximately three hundred feet from the towers B, and C respectively. Between the towers B and C there is suspended a strong steel cable E upon which is mounted the carriage by any suitable means such as rollers 10 mounted in the framework of the carriage and engaging the top of the cable and travelling thereon. Between the towers A and B, and the towers C and D respectively there are stretched cords 12 and 12' respectively, the cord in each instance being secured to the tripping lever 11 located on each of the towers B and C, as will be explained as the description proceeds.

It is to be understood that the cable E will sag in the middle to a point located about fifty feet below the tops of the towers.

The carriage which is mounted on the cable is preferably made of upright posts 13, 14, 15, and 16, and these are joined together at their bottom ends by means of the member 17, which may be of any desired weight, so as to hold the carriage in a vertical position at all times. To the top of these upright posts there is secured the platform F which has a cut away portion 18 on either of its sides near the central portion thereof. Between the uprights the rollers 10 are secured in any suitable manner, as upon spindles passing through the uprights.

The platform to the carriage is indicated by the reference character F and has a series of holes 19 therein for the reception of the drift pins 20 located on the bottom of the grippers, as shown in Figures 16 to 19 inclusive.

The grippers lie on top of the platform F of the carriage and are constructed in the following manner: There is a base member 21 of rectangular shape and open at one of its ends. Pins or bolts 22 and 23 penetrate both of the side portions of this member 21 and to these bolts are pivotally secured the members 24 and 25, which are curved toward each other at their outer ends and have holes therein for the reception of the bolts 26 and 27 to which are attached the jaws 28 and 29 of the grippers. The jaw 28 has a slot 30 therein into which the jaw 29 fits when the grippers are in closed position. The jaw 29 is single and has a roller 31 mounted thereon near its base. The jaw 28 also has a similar roller 32 mounted near its base, the two jaws being pivoted together by the bolt 33.

Figure 13:
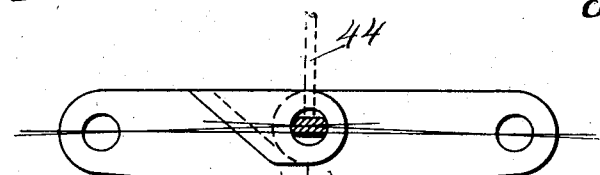
Figure 13 is a plan view of the trigger toggle joint in set position.
Figures 16, 17:
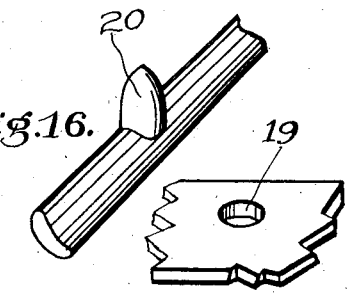
Figure 16 is a view of pins employed for holding gripper on the carriage.
Figure 17 is a view of the holes in the carriage for the gripper pins.
Figure 14:
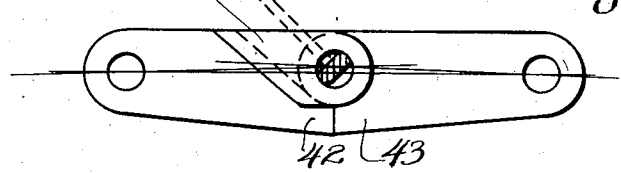
Figure 14 is a plan view of trigger toggle joint in tripped position.
Figure 18:
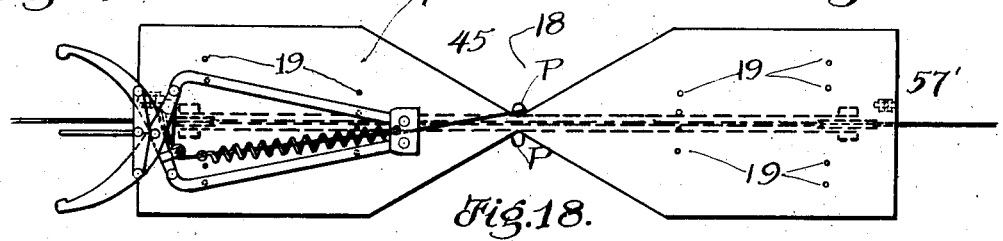
Figure 18 is a plan view of the carriage.
Figure 19:
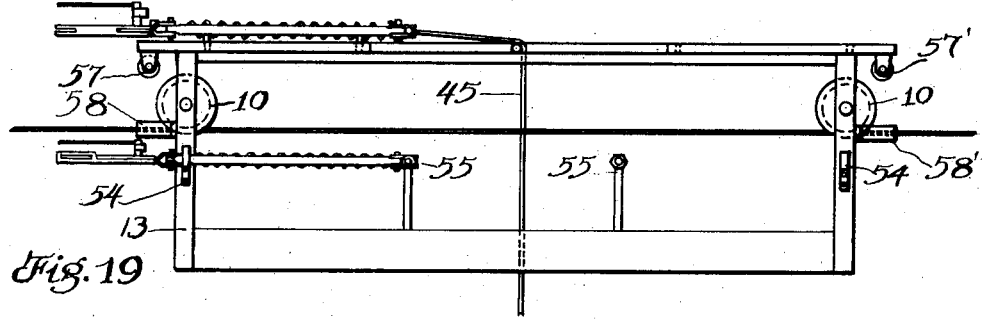
Figure 19 is a side elevation of the carriage, showing it mounted on the cable.
Figures 20, 21:
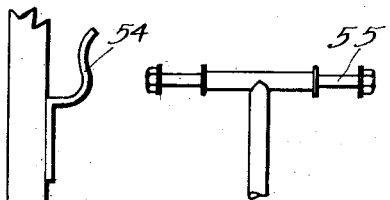
Figure 20 shows in detail the means for securing the shears to the carriage.
Figure 21 shows additional means for holding the shears to the carriage.

These grippers are equipped with a trigger and toggle joint structure for automatically closing them when the trailing rope or cable suspended from the aeroplane comes into engagement with them. At a point intermediate the pivot 33 and the ends of the jaws are secured bolts 34 and 35 upon which the toggle members 36 and 37 are pivotally secured. The toggle member 36 has a cut away portion 38 in one side thereof for the reception of the end of the other toggle member 37. The proximate ends of these two toggle members have holes therein for the reception of the cam bolt 39. This cam bolt 39 has flattened faces 40 which are not in contact with the toggle members 36 and 37 when the grippers are closed, but serve to hold the grippers open against the action of the spring 41. It will be seen that in Figure 13 that the pressure of the jaws of the grippers when in open position is on the cam bolt 39, at a point above a straight line drawn from the bolts 34 and 35, and the portions 42 and 43 are touching each other, but no pressure is exerted by them against each other. Now it will be seen that in Figure 14 that when the cam bolt 39 is turned by the trigger 44 that the pressure is relieved against this cam bolt and is shifted to the portions 42 and 43 which are forced downwardly as shown in Figure 5, and the gripping means will be closed by the action of the spring 41, and will be held in closed position by means of this spring and with the additional pressure of the trailing bag of mail attached to the end of the cable or cord 45 which is secured to the jaw 29, passes over a roller in the base of the jaw 28, then over a roller in the base of the jaw 29, then thru the spring 41, being rigidly secured to the spring 41 as at 46.

Secured to the carriage immediately below the grippers are shears for cutting the trailing cord after it has been gripped by the grippers. These shears are of the same general construction as the grippers with the exceptions that the jaws form shears or cutting means instead of gripping means in the above described grippers, with the exception that instead of the rollers with the cable passing over them for closing the grippers, the shears have two members 47 and 48 secured in a pivotal manner to the bolts 26' and 27' and joined together pivotally by the bolt 49 to which the spring 41' is attached.

The jaw 28' also has a projection 50 thereon against which the base of the jaw 29' strikes when in closed position, thus preventing the shears from further closing. The toggle joint and trigger mechanism is the same in the shears construction as in the previously described grippers. Near the end of the jaw 28' there is a guard member 51 into which the end of the jaw 29' fits when the shears are in closed position.

Figure 28:
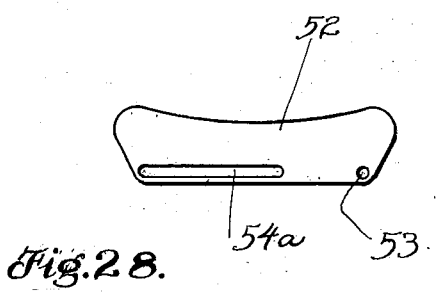
Figure 28 is a detail view of the guide 52.
Figure 12:
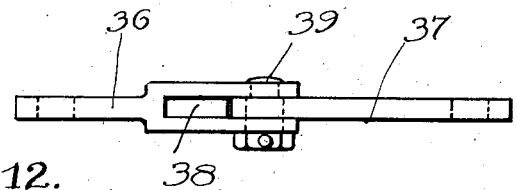
Figure 12 is an elevation of the trigger toggle joint employed in the shears and grippers.
Figure 15:
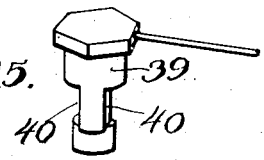
Figure 15 is a perspective view of the cam stud with trigger attached.

In Figure 28 there is shown a guide member 52 which may be attached to both the grippers and the shears, the purpose of which is to direct the trailing cable or cord against the trigger 44 at a point removed from the cam bolt 39, and thereby give greater leverage and lessen the chances of the trigger not tripping the toggle joint mechanism. This member 52 has a hole 53 therein adapted to fit onto the bolts 35 or 35', and has a slot 54ª for sliding engagement with the bolt 34 or 34'.

The shears are attached to the carriage by means of one of the side members 24' or 25' hooking over the hook 54 located on each of the upright members in the carriage frame, and the rear end of the shears is secured to a member 55 located on the base frame member of the carriage, by means of a nut on one end of the member 55.

From the above description it will be seen that the grippers and shears may be mounted in any one of four positions on the carriage frame.

The projections P are located in the cutaway portions of the platform F, against which the cable 45 rests when the grippers are in position.

The means for releasing the carriage from its initial position, and for imparting an initial movement thereto are best shown in Figures 1, 19, 25, 26, and 27 and comprise the following means: A bell crank lever 11 is mounted at the top of each of the towers B and C, said lever having a hole in its upper end, an upturned hook 56 on its lower end, and an eye 150 on the horizontal portion near the upturned end. A cord 12 is secured to a weight 61, runs thru the eye 150, then thru the eye in the upper end of the bell crank lever and onto the tower A or the tower D, as the case may be, and there secured. An enlargement 151 in the cord 12 prevents the cord from sliding thru the eye at the top of the bell crank lever beyond the desired point.

When the trailing cord from the aeroplane strikes the cord 12 it will sever the same, and the projection 151 will fall downwardly and strike the eye 150 and will there stop, and in the meantime, the weight 61 will have dropped but the sudden stop of the weight 61 caused by the engagement of the projection 151 with the eye 150 will jerk the hooked portion 56 away from engagement with the carriage, and the coiled spring 60 will impart motion to the carriage.

Located in the hold of the flying machine are means for handling articles such as mail which comprise the following: There is a compartment 70 which has longitudinal partitions 71 and 72 extending from the rear portion of the compartment 70 to a point about midway of the same. At the point where these longitudinal partitions stop there is a pivoted partition running crosswise of the compartment 70, which is pivoted at the bottom to allow it to swing forwardly against the articles stored in the forward portion of the compartment 70.

The partitions 71 and 72 have upwardly extending projections thereon and a bolt or other similar member 73 is mounted in the above-named projections. To this bolt 73 there is attached a downwardly opening U-shaped member 74 having a bolt 75 mounted therein, which bolt serves as a pivot for the discharging member 76. This member 76 has a backwardly opening recess 77 in one end thereof, and to the other end is pivoted the link 77' to which the trailing line 78 is attached.

Suspended from the recess 77 is another U-shaped member having a roller bearing 81 mounted between its open ends. To the closed end of this U-shaped member 80 there is attached a cord or cable 82 which is secured to the article 83 which is desired to be dropped or discharged from the flying machine.

The trailing line 78 is secured to a safety mechanism S and to the other end of this safety mechanism is attached the line 98 at the lower end of which is attached the eye 95. The main trailing line 84 and the cord or cable 82 are lead thru a slot 86 in the trap door 87, which trap door forms a part of the bottom of the compartment 70 and is hinged to the bottom of the compartment by means of a spring hinge 88, and the other end of the trap door is secured by a latch 89 which is operated from the interior of the flying machine by the knob 90.

The swinging partition 91 is secured to the bottom of the cock-pit by means of the hinge 92 at a point near where the hinge 88 is secured.

A windlass or reel 93 is secured in the upper forward portion of the compartment 70, the purpose of which is to wind up the article which is attached to the grippers. The grippers and the articles which may be attached to them are wound up by the windlass or reel by taking the hook 94 out of the eye 95 and securing said hook to the windlass or reel and winding the same up against the slot in the swinging trap door. Then the door will be pressed downwardly or pulled inwardly and upwardly, and thus the article attached to the grippers, together with the grippers will be brought into the compartment 70.

The safety mechanism S is provided for use only in case the trailing line 84 should become entangled with any object other than the grippers and shears. This mechanism consists of a piece of tubing, preferably of steel, as indicated by the reference character 96 fitting over another piece of similar tubing 97. The tubing 97 has a shoulder portion in its lower half against which fits a coiled spring, which extends upwardly and fits against the closed end of the tubing 96. The tubing 96 has a blade 98' at its lower end for sliding engagement with another blade 99, and secured by the same means is the guard 100 having a hole therein for the reception of the cord 98 which runs thru a hole in the tubing 97, thru the closed end of the tubing 96, and is there secured as by a knot 102. The cord 78 is secured to the closed end of the tubing 97 in the same manner as that just described said cord passing thru the entire length of the tubing and going thru a hole in the closed end of tubing 96. A bolt 103 holds the two pieces of tubing together, and prevents the spring 104 from pushing the two pieces of tubing apart, but allows uninterrupted movement of the closed ends towards each other. The strength of the spring 104 will be as strong as desired, but strong enough to prevent the blades 98 and 99 from cutting the cord 101 while articles are being picked up, but which will allow the cord to be severed when the trailing cord 84 should become entangled with the cable E or other immovable objects, if such should be the case.

The method of operation of my device is as follows:

The towers A, B, C, and D are all built in a straight line, and the carriage is pulled up near the tower B and there secured by the release means against the coiled spring located on the cable E. The cord 12 is secured to the bell crank lever of the releasing means and stretched to the tower A. The shears and grippers are placed in position, and the bag of mail or other article is secured to the grippers and allowed to hang down below the platform. The aeroplane is equipped with the special means above described, and a bag of mail or other article is suspended from the aeroplane ready to be dropped. The trailing cord with the weight 85 attached is also trailing from the aeroplane, and the safety means S as above described is in position. The aeroplane travels along the line shown as a dotted line in Figure 27. The trailing cord strikes the cord 12 and breaks the same, thereby releasing the securing means for holding the carriage up near the tower B. The spring on the cable E imparts a momentum to the carriage and it moves down the cable E. The aeroplane preceeds and the trailing cord with the weight attached strikes the cable E and is guided along the cable into the jaws of the grippers, the trigger causes the grippers to securely hold the cord. The cord is then thrown into the jaws of the shears and the cord is there severed, allowing the weight to drop. The grippers and the bag of mail or other article attached to them will be carried away by the aeroplane.

At the same time that the grippers are lifted from the carriage, the trailing cord will pull on the mechanism located in the cock-pit and cause the bag of mail or other article suspended therefrom as the aeroplane approaches the towers to be dropped.

In case the trailing cord or the weight attached thereto should by chance become entangled with any object to an extent so as to endanger the flight of the aeroplane, the safety mechanism would be brought into play and the trailing cord with weight would be severed from connection with the aeroplane, and no harm would result to the occupants thereof.

No means are shown for pulling the carriage into place near the towers, but it is to be understood that when it comes to a position of rest it will be at the lowest point of the cable E midway between the two towers B and C, and will be very near the ground. Here it will be loaded, the grippers and the shears opened and set, and by means of a cord (not shown) will be pulled into position near one of the towers B or C.

Having thus fully described my invention, what I desire to secure and protect by Letters Patent will be set forth in the appended claims, it being understood that since I have shown a preferred embodiment of my invention, that certain changes may be made in the structure of the different parts of my invention as may fall within the scope of the appended claims.

I claim:

1. In a device for handling cargo in aerial navigation, a carriage mounted on a cable, a pivoted member adapted to be mounted in an aeroplane, and to releasably suspend a cargo from one of its ends, a trailing cord suspended from the other end of the pivoted member, gripping means located on the carriage and adapted to have a cargo attached thereto, shears on the carriage, all of said means cooperating to grip the trailing cord, to cut the trailing cord below the point gripped, and to drop the cargo releasably suspended from the pivoted member in the aeroplane.

2. In a device for handling cargo in aerial navigation, four towers in alinement with each other, a cable suspended between the two middle towers, a carriage mounted for travel on said cable, releasable means for holding the carriage near one of the towers, a spring on the tower pressing against the carriage, a cord attached to the releasing means and to another tower, means for severing the cord and releasing the carriage, said spring imparting movement to the carriage.

3. In a device for handling cargo in aerial navigation, a carriage mounted on a cable, a cord trailing from a flying machine, grippers mounted on the carriage and adapted to have a cargo attached thereto, said grippers having jaws held open by toggle joints, a cam and trigger for tripping the toggle joints when said trigger comes in contact with the trailing cord, a spring for closing the jaws of the gripper and holding them in closed position.

4. In a device for handling cargo in aerial navigation, a carriage mounted on a cable, a cord trailing from a flying machine, shears mounted on the carriage and being held in open position by a toggle joint, a cam and trigger for tripping said toggle joint, a spring for closing said shears when the trigger comes in contact with a trailing cord.

5. In a device for handling cargo in aerial navigation, a cord trailing from a flying machine, a safety mechanism in said cord consisting of two pieces of steel tubes fitting one over the other, a hole in the side of one of the steel tubes, a cord secured to one of the steel tubes and passing thru the hole in the other steel tube, a spring pressing the steel tubes apart from each other, knives on the exterior of the steel tubes adapted to sever the cord when the two tubes are pulled together to a point where the knives on the steel tubes engage the cord.

6. In a device for handling cargo in aerial navigation, a trailing cord for picking up cargo attached to means for dropping cargo, means located in the trailing cord adapted to prevent severance of the cord under normal conditions, together with means for severing said trailing cord when it becomes annexed to a stationary object.

7. In a device as set forth in claim 3, drift pins attached to grippers and adapted to fit into holes in the top of the carriage.

8. In a device of the class described, the combination of an aeroplane, adapted to have a mail bag suspended therefrom, a trailing cord suspended from the aeroplane and having a weight attached to its lower end, a trap door having a slot therein in the bottom of the aeroplane thru which the bag of mail and the trailing cord are suspended, a series of towers mounted on the ground, a cable stretched between two of the towers, a carriage mounted on the cable, grippers lying on top of the carriage, and adapted to have a mail bag secured thereto, shears mounted on the carriage at a point below the grippers, releasable means mounted on one of the towers for holding the carriage near one of the towers, a cord attached to said releasable means and to another tower, all of said means cooperating to cut the cord holding the releasable means, to start the carriage in motion along the cable, to cause the grippers to secure themselves to the trailing cord, to cause the trailing cord to be severed by the shears at a point below the grippers, and to carry away the grippers with the bag of mail attached thereto.

9. In a device for handling cargo in aerial navigation, a movable object mounted above the ground, grippers and shears mounted on the movable object, the grippers being adapted to have a cargo secured thereto, means adapted to be mounted in a flying machine to pick up the grippers with the cargo attached thereto, the shears being adapted to sever the picking up means below the grippers, and means adapted to be mounted in a flying machine to automatically release a cargo simultaneously upon picking up the grippers with the cargo attached thereto.

10. In an article of the class described, a series of towers mounted in alinement with each other, a series of cords extending along these towers, a carriage mounted on one of the cords and adapted to move therealong, grippers loosely mounted on the carriage and adapted to have cargo secured thereto, shears mounted on the carriage below the grippers, means adapted to be located in a flying machine having trailing cords suspended therefrom, and adapted to release cargo from the flying machine when one of the cords becomes secured to the grippers located on the carriage, and means located on one of the towers for imparting movement to the carriage along the cord on which said carriage is mounted.

11. Apparatus for handling cargo in aerial navigation, said apparatus consisting of grippers having a base member, pivoted members mounted in the base member, jaw members pivoted to the ends of these pivoted members, said jaws crossing each other and being pivoted to each other at the point of crossing, other pivoted members mounted on the jaws and extending toward each other, a cam with trigger attached being pivoted to one of these other pivoted members at a point where the two other pivoted members meet, the other pivoted members and the cam holding the jaws open against a tension spring normally pulling the jaws together, and pulling the jaws together when the trigger and cam are turned on their pivot.

12. Apparatus in aerial navigation consisting of shears mounted on a carriage, the said carriage being adapted to travel along a suspended cable, said shears comprising a base member, pivoted arms mounted on said base member, jaws pivotally secured to the ends of these pivoted arms and crossing each other, the jaws being pivoted at the crossing point, members pivoted to the ends of the pivoted arms and pivotally connected together at their other ends, a coiled spring secured to the junction point of the members secured to the ends of the pivoted arms and also secured to the base member, cam and toggle joint mechanism secured to the jaws and adapted to hold the jaws open against the pull of the coiled spring, a guide member cooperating with the toggle joint mechanism and with a trigger secured to the toggle joint mechanism.

In testimony that I claim the foregoing as my own I have hereunto affixed my signature this the 29th day of June 1925.

FRANK F. BRADSHAW.